United States Patent

Kulas

[11] Patent Number: 6,044,047
[45] Date of Patent: *Mar. 28, 2000

[54] STORING CD SEGMENTS FOR QUICK SCANNING IN MULTI-CD PLAYERS

[75] Inventor: Charles John Kulas, San Francisco, Calif.

[73] Assignees: Sony Corporation, Tokyo, Japan; Sony Electronics Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,862

[22] Filed: Oct. 21, 1997

[51] Int. Cl.[7] .................................................. G11B 17/22
[52] U.S. Cl. ............................................... 369/32; 369/34
[58] Field of Search ................................. 369/32, 33, 34, 369/30, 36, 37, 38, 39, 178

[56] References Cited

U.S. PATENT DOCUMENTS

| | | | |
|---|---|---|---|
| 4,912,671 | 3/1990 | Ishida ........................................ | 364/900 |
| 5,216,644 | 6/1993 | Shiba ......................................... | 369/32 |
| 5,245,600 | 9/1993 | Yamauchi, et al. ........................ | 369/49 |
| 5,253,234 | 10/1993 | Ogawa, et al. ........................... | 369/36 |
| 5,408,449 | 4/1995 | Oh ............................................. | 369/32 |
| 5,430,697 | 7/1995 | Bu .............................................. | 369/32 |
| 5,446,714 | 8/1995 | Yoshio, et al. ............................ | 369/48 |
| 5,457,669 | 10/1995 | Kim et al. ................................. | 369/32 |
| 5,467,326 | 11/1995 | Miyashita, et al. ....................... | 369/30 |
| 5,467,329 | 11/1995 | Hashimoto ............................... | 369/48 |
| 5,619,731 | 4/1997 | Jenkins, et al. ........................... | 395/873 |
| 5,646,921 | 7/1997 | Yokota, et al. ............................ | 369/50 |
| 5,668,788 | 9/1997 | Allison ..................................... | 369/30 |

*Primary Examiner*—Tan Dinh
*Attorney, Agent, or Firm*—Harold T. Fujii

[57] ABSTRACT

The present invention provides a multi-CD player with a quick scanning feature where the multi-CD player stores samples of a portion of each of the CD's into a fast access memory device such as a random access memory (RAM). The multi-CD player provides a mode where the stored portions are played back quickly so that a user can select which CD to play based on the playback portions.

15 Claims, 3 Drawing Sheets

STORING CD SEGMENTS FOR QUICK SCANNING IN MULTI-CD PLAYERS

BACKGROUND OF THE INVENTION

This invention relates generally to multi-CD players and more specifically, to a multi-CD player having a quick scanning feature.

Audio compact disc (CD) players are a popular means of reproducing high-quality music. As CD players have become more sophisticated, the ability of the CD player to handle multiple audio CD's has become common. Typically, a low-cost multi-CD player can handle from three to six audio CD's. More expensive models can handle ten or more CD's while "jukebox" CD players can handle dozens of CD's. In all of these multi-CD players, a user can select which CD to automatically load onto the CD playing mechanism by, for example, pressing a button. A CD corresponding to a button press is then taken from a CD storage area within the player, such as a CD tray, and placed on the CD playback mechanism.

In the case of CD jukeboxes, since there are a large number of CD's loaded into the machine, a visual display is usually provided so that the user may quickly determine which CD to select. However, such displays are relatively expensive and are not found in the cheaper multi-CD players. Also, the displays are not entirely convenient since a user of the multi-CD player often wishes to switch the CD being played by using a remote control unit from across the room. Since the display can only be seen from up-close the user is not able to effectively use the remote control to switch CD's.

Even in the lower cost multi-CD players where there may be, for example, six CD's, a user often forgets which CD's are loaded into the device and has to play each CD in succession in order to find the particular CD of interest. This is very inconvenient because the lower cost multi-CD players, and even the higher cost multi-CD players, require 10–15 seconds to load, spin up, and begin playing each CD. Thus, where there are six CD's in a device it may take a minute or more to discover the CD of interest.

It is therefore desirable to have a quick scanning feature in multi-CD players so that a user can quickly determine and select a desired CD for playback.

SUMMARY OF THE INVENTION

The present invention provides a multi-CD player with a quick scanning feature. The multi-CD player stores audio samples of a portion of each of the CD's into a fast access memory device such as a random access memory (RAM). The multi-CD player provides a mode where the stored portions are played back quickly so that a user can select which CD to play based on the played-back portions.

DETAILED DESCRIPTION OF A PREFERRED EMBODIMENT

Figure 1:
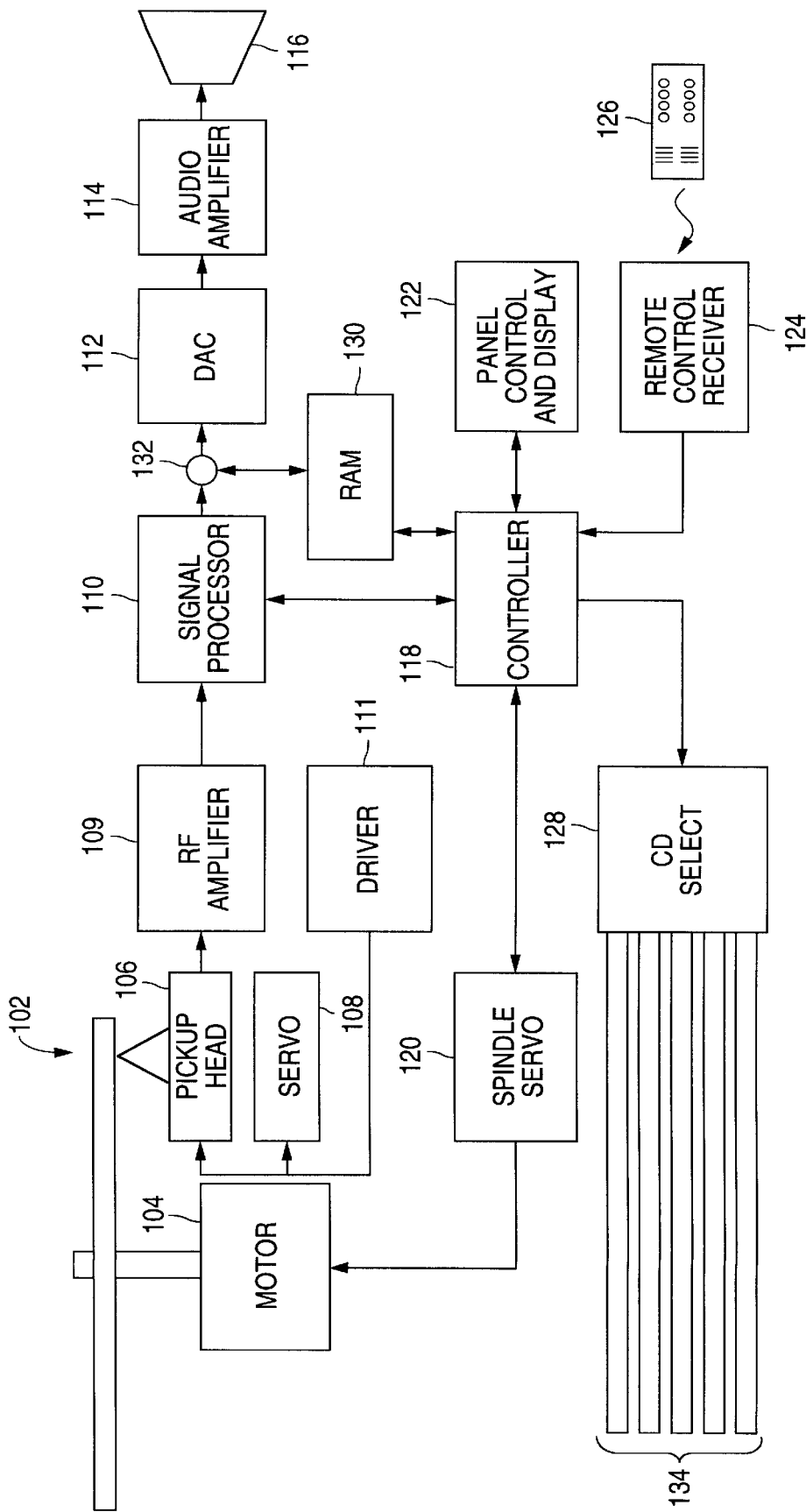
FIG. 1 is a block diagram of a multi-CD player of the present invention.

FIG. 1 shows block diagram 100 of the multi-CD player of the present invention.

Many of the subsystems shown in FIG. 1 are generic to a standard CD player and their design and interrelationships are well-known to one of skill in the art.

In FIG. 1, CD 102 is spun by motor 104. Pickup head 106 detects digital data on the spinning CD and converts the data into electrical impulses. Servo 108 positions pickup head 106 over successive data on the CD. The data is typically laid out in a single concentric spiral track on the CD. The electrical impulses output from pickup head 106 are output to RF amplifier 108 which detects the strength of the signal and provides a feedback path through driver 110 to accurately position pickup head 106 over the data track on the CD.

The signal from RF amplifier 108 is fed to signal processor 110 which converts the signal into digital data in the form of binary numbers. The digital data is output to digital-to-analog converter (DAC) 112 where the binary numbers are converted to an analog signal representing the sound recorded onto CD 102. The analog signal from DAC 112 is input to audio amplifier 114 which amplifies the analog audio signal to drive speaker 116 so as to produce audible sound. Controller 118 is used to coordinate the various subsystems represented by blocks in FIG. 1 to achieve different features. One of the basic functions of controller 118 is to control spindle server 120 to moderate the rotation of the CD being played.

Controller 118 also receives signals from panel control and display 122 and remote control receiver 124. Panel control and display 122 and remote control receiver 124 are user interfaces which generate signals to controller 118 in response to a user's operation of the multi-CD player's controls. Typical functions initiated by the user are, for example, selecting a CD for playback, selecting a song on the CD, fast forwarding and rewinding playback of the CD through a song or songs on the CD, pausing CD playback, etc. Remote control receiver receives signals from remote control device 126 which typically transmits the user's operation of the remote transmitter's controls by infrared transceivers.

In a multi-CD player, CDs stored within the player can be automatically loaded onto, and off of, motor 104 by the user's operation of the user interface. Typically, each CD is assigned a "slot" number so that the CDs can be easily referenced. This is similar to an index number so that, for example, in a 6-CD player, the CDs occupy slots 1–6 internally, and can be referenced by the slot numbers. CD select 128 is under control of controller 118 and has a plurality of CDs at 134 that can be loaded onto motor 104. CD 102 can be automatically removed to occupy an empty slot (not shown) at CD select 128.

In a preferred embodiment, the quick-scan feature of the present invention uses a RAM such as RAM 130. As shown in FIG. 1, RAM 130 is controlled by controller 118. RAM 130 receives data from, and sends data to, the digital data path from signal processor 110 to DAC 112 through a mechanism such as a bus interface represented in FIG. 1 at 132. Although not indicated in FIG. 1, bus interface 132 is also under the control of controller 118.

Bus interface 132 routes data from signal processor 110 to RAM 130 and from RAM 130 to DAC 112, as dictated by controller 118. This routing is selectable to route data from signal processor 110 to DAC 112 or from RAM 130 to DAC 112. Additionally, addressing and control circuitry in RAM 130 serves to selectively store data received at RAM 130 from signal processor 110 into the RAM at desired locations.

In the preferred embodiment, controller 118 detects when a new CD has been loaded into the multi-CD player. Such detection is a simple matter because it typically requires the user to depress a button or use another control to open a panel in the CD player to insert a new CD. The preferred embodiment of the invention automatically begins playing a newly-inserted CD. Upon playing a newly-inserted CD, the first four seconds of audio data on the CD are sampled by reading the first 4 seconds of data output from signal processor 110. The data is stored into RAM 130. The data output from signal processor 110 is simultaneously sent to DAC 112 so that the user is able to hear the playback of the newly-inserted CD at the same time it is being sampled into RAM 130.

After sampling of the first four seconds of the newly-loaded CD is accomplished, sampling ends and no further data from the CD is stored into RAM 130. However, data from the CD being played continues to be sent to DAC 112 so that the CD plays back continuously until it is done or until the user instructs that the playback be stopped. Thus, sampling of a newly-loaded CD is transparent to the user and occurs at the time the CD is first loaded into the player.

The present invention uses flags maintained in a memory in controller 118. A sample flag for each slot in the multi-CD player indicates whether a valid sample exists for the associated slot. Upon resetting the system (such as when batteries are first installed, a forced reset, etc.) the flags are cleared, or reset, to indicate that no valid samples exist for any of the slots. During the course of operation as CDs are swapped out, the flag corresponding with the swapped-out slot is reset. Whenever new sampling of a new CD completes successfully, the flag corresponding to the slot for the new CD is set. Thus, the flags keep an accurate log of whether a valid sample for a particular CD slot exists in RAM 130.

In the preferred embodiment, where 4 seconds of the beginning of a CD is the target sample length, the sample flag for the particular CD slot is set if the sample duration is at least 2 seconds. A sample may be less than the target duration where, for example, a user inserts a new CD but does not wish to play it immediately. With the auto-play feature discussed above, the user may interrupt the immediate playing of a newly-inserted CD so that less than 4 seconds are sampled. Possibly no sampling will have occurred at all. If at least 2 seconds of sampling is achieved the sample flag will still be set. This value is arbitrarily picked to still provide a long enough time for a user to recognize a CD upon playing back the samples while allowing for situations where a full sample is prevented. The full sample can later be recovered when the partially-sampled CD is played by the user at a later time, or in other ways, as discussed below.

Naturally, other ways of obtaining samples from the CDs are possible aside from the auto-play feature in the preferred embodiment. For example, the CD can be sampled when it is first played in the machine. Another possibility is for sampling of unsampled CDs to occur after the user has turned off the multi-CD player. After power is turned off to the system by user selection, the system is actually kept "warm" powered for purposes of determining whether valid samples exist for all slots that have CDs loaded into them. In this way, the CDs can be sampled after the user has finished with the system. Any unsampled CDs are successively loaded and played back for purposes of obtaining a full sample. Naturally, bus interface 132 prevents the data from being sent to DAC 112, audio amplifier 114 and speaker 116 so that the user does not hear the playback. Alternatively, power can be shut off to DAC 112 and audio amplifier 114 to mute the playback. Thus, the data from the CD is only retrieved for purposes of storing a sample into RAM 130.

Another way to handle obtaining of samples is to provide a "sample" button on the control panel so that sampling is performed at the request of the user.

Figure 2:
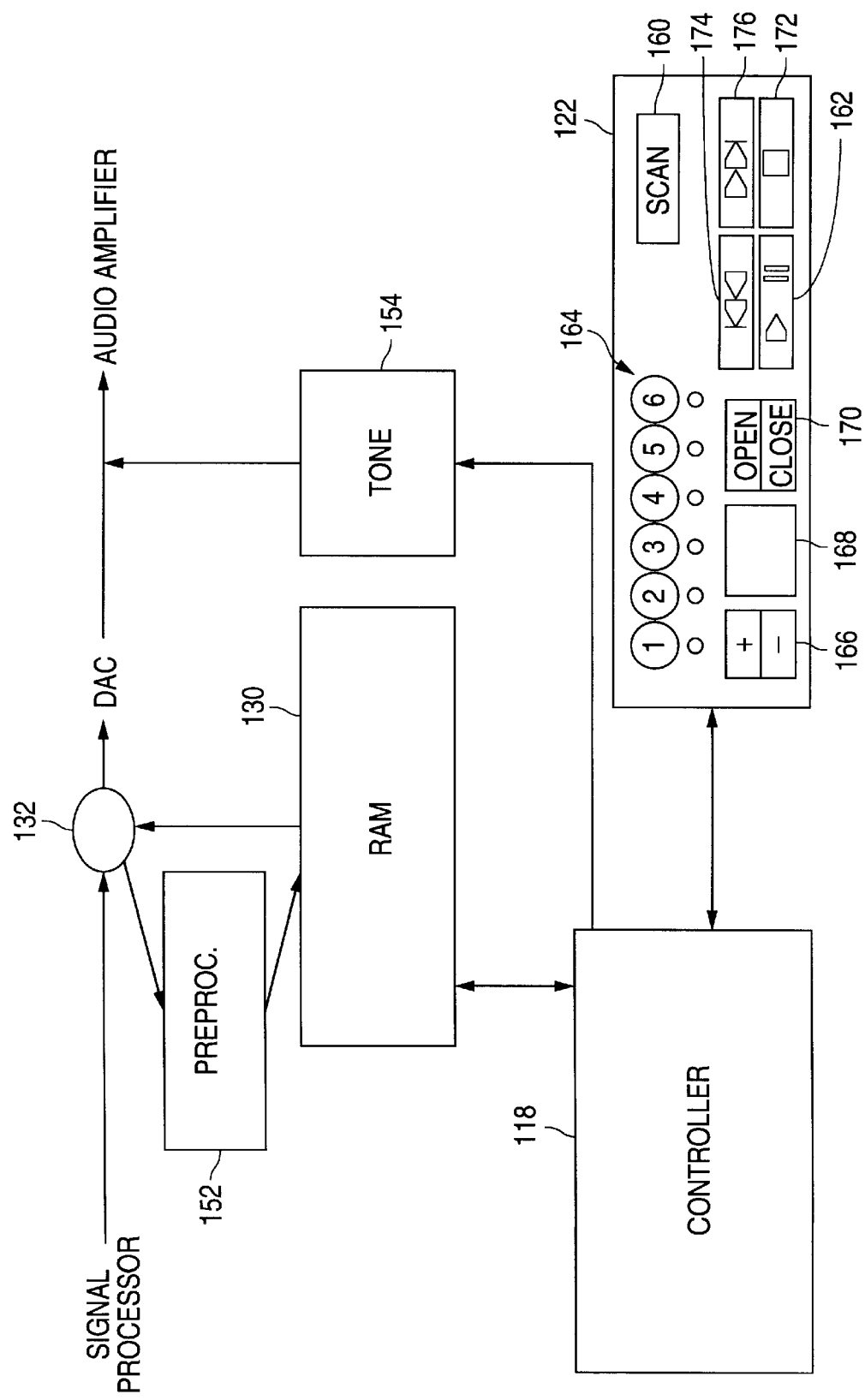
FIG. 2 shows details of selected subsystems in FIG. 1.

FIG. 2 shows details of selected subsystems of FIG. 1.

In FIG. 2, data from bus interface 132 passes through pre-processor 152 before the data is sent to RAM 130 for storage. Pre-processor 152 acts to reduce the amount of data necessary for storage in RAM 130 to create a 4 second sample. In the preferred embodiment, the left and right stereo channels present on the bus between signal processor 110 and DAC 112 are combined in pre-processor 152. An easy way to do this is to add the digital numbers of the left and right channels for the same CD audio signal sample and average the values so as to produce a monophonic, or "mono," binary representation of the stereo data. A second way to reduce the amount of data for a sample is to reduce the bit-resolution of the samples from the CD bit-resolution of 16 down to only 8 bits. Of course, both of these approaches result in a lower fidelity audio signal. Especially in the latter case where the bit-resolution is reduced the low frequencies are drastically reduced to the point they may not be discernible. Either one or both of the above-mentioned data reduction practices can be employed. If both are employed the amount of data necessary for a given sample in RAM 130 is reduced by a factor of 4. The preferred embodiment only uses the combining of left and right stereo data to produce a mono data sample but keeps the bit-resolution at 16. Other data reduction methods are possible such as compression and decompression but these may present a heavy burden on processing power and are expensive to implement.

Although the present invention discusses a target sample length of 4 seconds, any length of sample is possible. The tradeoff is the amount of RAM needed to store the samples. The size of the RAM also depends on the number of CDs in the system and on pre-processing to reduce data size as discussed above. As an example calculation, the sample rate in an audio CD is 44,100 samples per second. Each sample includes two 16-bit samples for left and right stereo channels. This yields 176,400 bytes/second in the data path between signal processor 110 and DAC 112. Since pre-processor 152 averages the left and right channels, the rate of data to RAM 130 is 88,200 bytes/second. To obtain 4 second samples for 6 CDs requires 2,116,800 bytes to be stored. A 2 Megabyte RAM buffer provides 2,097,152 bytes. This is almost enough to contain the number of bytes calculated. The difference in size is minimal and can be accounted for by reducing, by some few milliseconds, the sample length from one or more samples. Therefore, a 2 Megabyte RAM is adequate to achieve the parameters of the present invention to provide 4 second samples for 6 CDs in a multi-CD player. Note that the RAM allocation is flexible. The sample size need not be fixed at 4 seconds and can vary among different Cds.

Returning to FIG. 2, panel control and display 122 is shown having a typical arrangement of buttons. Note that it is possible to have many arrangements of buttons, controls and other displays, however, the arrangement shown in FIG. 2 is fairly representative of a standard arrangement for a multi-CD player. Although remote control receiver 124 is not discussed in detail, its operation in connection with remote control transmitter 126 is very similar to the operation of panel control and display 122 as the functions provided by each are almost the same.

A new control, SCAN 160, is provided for user operation. Other buttons on the panel include CD SELECT buttons 1–6 at 164, and the indicator lights directly under CD SELECT buttons which light to show the currently selected CD. VOLUME controls at 166, LCD display 168, OPEN/CLOSE 170, STOP 172, and REWIND 174 and FAST FORWARD 176. The SCAN control allows a user to initiate the quick-scan of the present invention. Other ways to initiate a quick-scan are possible. For example, the quick-scan can be initiated by double-pressing one of the standard keys such as PLAY key 162.

Figure 3:
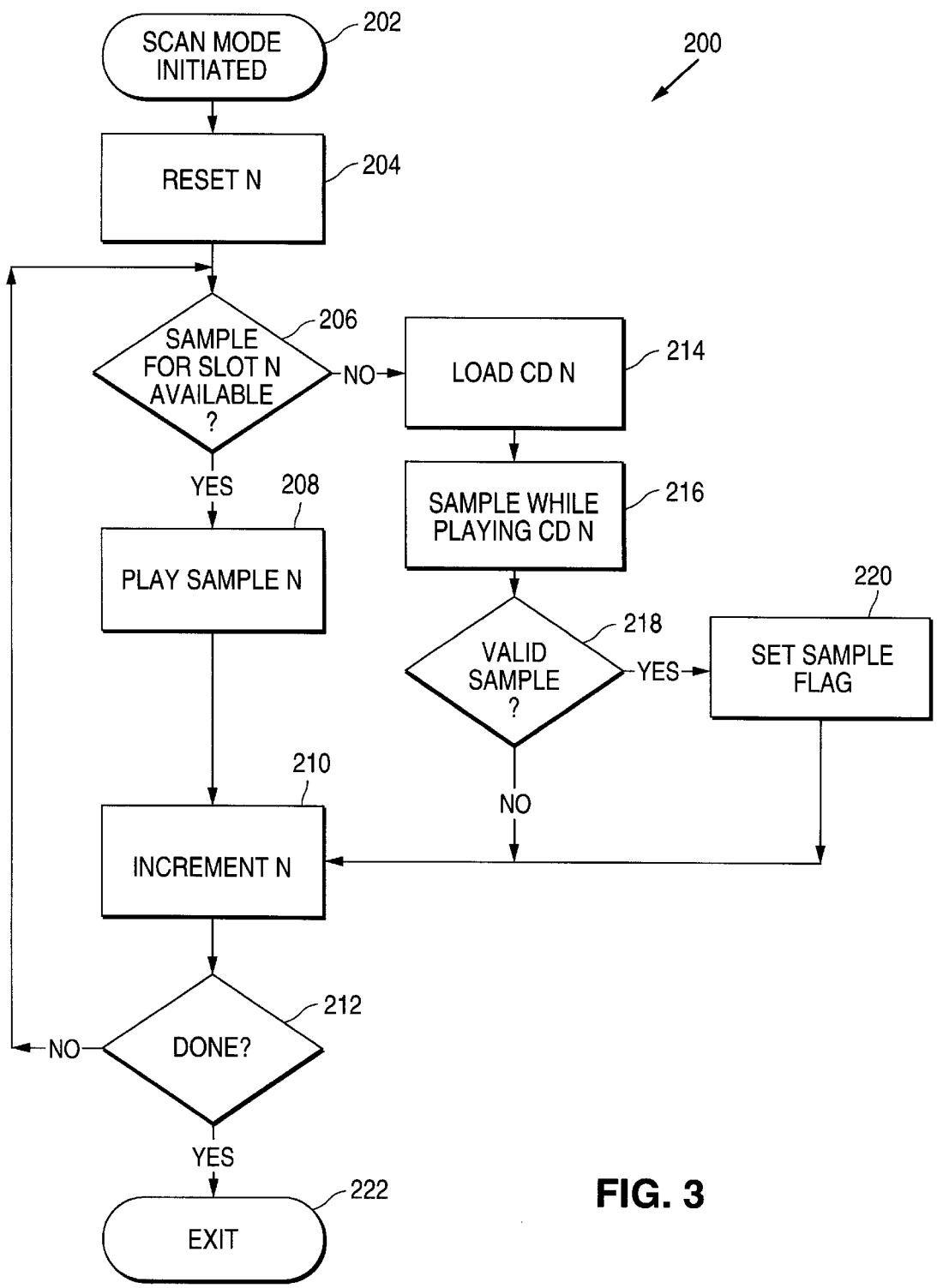
FIG. 3 is a flowchart of the steps used to implement a quick-scan mode in the present invention.

FIG. 3 is a flowchart for implementing a quick-scan mode of the present invention.

In FIG. 3, flowchart 200 is entered at 202 when the scan mode is initiated. The steps of the flowchart can be performed by a processor or microcontroller located within controller or by distributed logic, as desired. At step 204 a variable "N" is reset to 0. This variable keeps track of the current CD slot being scanned. At step 206 a check is made as to whether a sample for slot N is available. In the example of a CD player having 6 slots, the slots are designated as 0–5.

Assuming a sample is available for slot N, step 208 is executed to play the sample so that it is audible to a user. For sample playback to occur, controller 118 directs RAM 130 to output sample data for the particular slot through bus interface 132 to DAC 112. As described above, this results in a mono sample of the first four seconds of the CD residing in slot N. After the sample completes playing, step 210 is executed to increment N. As long as N is in the range 0–5 the process repeats by looping from step 212 back to step 206 to process successive slots.

Assuming, at step 206, that it is determined that no sample exists for slot N, execution proceeds to step 214 where the CD in slot N is loaded onto motor 104 for playback. Step 216 then executes to sample the CD while the CD is played back audibly. If a valid sample has been obtained as determined by step 218, the sample flag for the particular slot is set at step 220. A valid may not be obtained as where the user aborts the sample playback, or fast forwards through the sample scan, as discussed below. In these cases, the check at step 218 directs execution to step 210, bypassing step 220, so that the sample flag for the slot is not set.

At step 210, N is incremented to process the next slot. At 212, processing is ended when all slots have been processed.

A preferred embodiment of the present invention uses tone generator 154, shown in FIG. 2. Tone generator 154 outputs a tone to audio amplifier 114. The tone is used to indicate the end of a sample during sample playback mode and to indicate the start of a next sample. The use of tone generator 154 is optional as a brief gap in playback may be adequate to indicate that a new sample is starting. Alternatively, a "click" or other audible indication can be used, or no indication at all. Another possibility is to use voice synthesis to announce the slot number of the CD sample being played overlayed with the playback of the sample during the scan mode. Other ways of the beginning and end of samples, and which sample is playing, are possible.

In the preferred embodiment, the user is able to control the playback of samples. For example, the user can use controls REWIND 174, FAST FORWARD 176, to rewind or fast forward the playback of samples similar to the way these controls are used traditionally to move among songs on a CD or to move among CDs, themselves. Where, for example, REWIND 174 is pressed during playback of samples, the currently playing sample is made to restart from the beginning of the sample. If REWIND 174 is presses twice in quick succession, playback of the current sample is stopped and playback of a previous sample, if any, in the sequence is initiated. Similarly, depressing FAST FORWARD 176 results in the present sample being stopped from playback while a successive sample, if any is immediately played.

An important aspect of the present invention allows a user to select a CD to be played during the quick-scan mode when samples are being played back. In the preferred embodiment, this is accomplished by the user pressing PLAY 162 while a sample is being played. When this occurs, the current sample's associated slot is noted and the CD for the slot is retrieved and played. The maximum amount of time a user would spend using the quick-scan feature to scan through 6 CDs is 24 seconds. However, a user will be able to identify a CD with less than 4 seconds of sample time and will be able to use FAST FORWARD to skip through the samples more quickly. Typically, the user will be able to identify and select a CD in a matter of seconds rather than the tens of seconds required using a traditional multi-CD player without the quick-scan feature of the present invention.

Although the invention has been discussed with respect to a specific embodiment, the scope of the invention is to be determined solely by the appended claims.

I claim:

1. A multi-CD player with a quick scanning feature, wherein the multi-CD player stores into a random access memory an audio sample portion of each of a plurality of CD's loaded into the multi-CD player and plays back each of the audio sample portions in succession to enable a user to select which CD to play based on the played-back audio sample portions.

2. The multi-CD player of claim 1, further comprising a user interface with a control operated by a user, wherein when the control is operated during playback of a given portion, the CD corresponding to the given portion is played back.

3. The multi-CD player of claim 1, further comprising an indicator for causing an audible indication to separate the end of a previous portion from the beginning of a subsequent portion.

4. The multi-CD player of claim 3, wherein the audible indicator uses a brief tone as the indication.

5. The multi-CD player of claim 3, wherein the audible indicator uses a synthesized voice overlayed with the portions, wherein the synthesized voice overlayed onto each portion recites the number of the CD corresponding to the portion.

6. The multi-CD player of claim 1, wherein each CD includes stereo left/right data, wherein the portion sampled from each CD includes data from only one of the pair of stereo left/right signals.

7. The multi-CD player of claim 1, wherein each CD has a bit-resolution, wherein sampled portions are at lower bit-resolutions than the CD's.

8. The multi-CD player of claim 7, wherein the CD bit-resolution is 16 bits, wherein the sampled portion bit resolution is 8 bits.

9. The multi-CD player of claim 1, further comprising a user interface with a control operated by a user during play back of the portions to cause faster play back of the portions.

10. The multi-CD player of claim 1, further comprising a user interface with a control operated by a user during play back of the portions to cause the play back to rewind to a previous point.

11. A multi-CD player having a quick scanning feature, the multi-CD player comprising a CD selector for selectively playing one of a plurality of CDS;

CD read circuitry for retrieving audio data from a CD and outputting the retrieved data;

conversion circuitry coupled to the CD read circuitry for generating an audible audio signal in response to the retrieved data;

a random-access memory (RAM) for storing portions of retrieved data and for outputting stored portions of retrieved data;

a data router coupled to the CD playback circuitry and the RAM, wherein the data router selectively routes portions of the retrieved data to the RAM for storage;

a user input device for indicating that a user's selection; and a controller coupled to the CD selector, CD read circuitry, data router, RAM and user input device, wherein the controller issues signals to store a first portion of audio data from a first CD and a second portion of audio data from a second CD into the RAM, wherein the controller causes the RAM to output the first portion and second portion in succession to the conversion circuitry while detecting a signal from the user input device to indicate a user's selection of one of the first or second portions, wherein the controller plays the first CD if the user has selected the first portion and wherein the controller plays the second CD if the user has selected the second portion.

12. A method for selecting one of a plurality of audio CDs for playback in a multi-CD player operated by a user, the multi-CD player including a controller coupled to a random access memory (RAM), CD playback circuitry and audio output, the method comprising the steps of;

using the controller to store portions of data from a plurality of CDs into the RAM;

playing back the stored portions so they are audible to a user;

allowing the user to select a CD to play based on the played back portions; and playing the selected CD.

13. A multi-CD player with a quick scanning feature, wherein the multi-CD player stores into a random access memory samples of a portion of each of a plurality of CD's loaded into the multi-CD player and plays back the portions in succession to enable a user to select which CD to play based on the played-back portions, wherein each CD includes stereo left/right data, wherein the portion sampled from each CD includes data from only one of the pair of stereo left/right signals.

14. A multi-CD player with a quick scanning feature, wherein the multi-CD player stores into a random access memory samples of a portion of each of a plurality of CD's loaded into the multi-CD player and plays back the portions in succession to enable a user to select which CD to play based on the played-back portions, wherein each CD has a bit-resolution, wherein sampled portions are at lower bit-resolutions than the CDs.

15. The multi-CD player of claim 14, wherein the CD bit-resolution is 16 bits, wherein the sampled portion bit resolution is 8 bits.

* * * * *